March 17, 1970  R. A. KAMINSKAS ET AL  3,501,632
PENETRATING RADIATION SYSTEM FOR DETECTING THE AMOUNT OF
LIQUID IN A TANK Filed June 4, 1964  2 Sheets-Sheet 1

RIMVYDAS A. KAMINSKAS,
DONALD H. WRIGHT,
INVENTORS.

BY

RIMVYDAS A. KAMINSKAS,
DONALD E. WRIGHT,
INVENTORS

BY Barlelew & Lewis

United States Patent Office 3,501,632
Patented Mar. 17, 1970

3,501,632
PENETRATING RADIATION SYSTEM FOR DETECTING THE AMOUNT OF LIQUID IN A TANK
Rimvydas A. Kaminskas, Monrovia, and Donald E. Wright, San Gabriel, Calif.; may be granted to National Aeronautics and Space Administration under provisions of 42 U.S.C. 2457(d)
Filed June 4, 1964, Ser. No. 372,648
Int. Cl. G01n 21/26
U.S. Cl. 250—43.5         19 Claims This invention has to do generally with the detection or measurement of matter in a definite region, such as the bounded interior of a container or the like.

The invention is concerned more particularly with systems capable of making such measurements independently of the detailed configuration of the matter within the region or container. The invention thus permits accurate measurement of the amount of liquid present in a tank, for example, during violent agitation of the liquid, as by tank movement, by passage of gas through the tank, by boiling of the liquid, or the like. The invention is thus useful, for example, for monitoring the total amount of chemical reactants present under such conditions of agitation, which may produce an essentially random distribution of the reactants.

The invention is particularly valuable for indicating the amount of liquid present in a tank of a violently maneuvering aircraft, or of a spacecraft, especially under conditions of weightlessness or "zero g," as in an orbiting earth satellite. Such detection and measuring capability is useful for such purposes as monitoring the consumption of propellant or other stored material on a space vehicle.

It has previously been proposed to detect liquid in a tank by projecting through the tank a beam of penetrating radiation of suitable energy, typically gamma rays from a radioactive element such as cobalt-60, and observing the absorption or scattering of such radiation due to the liquid. However, such previous systems necessarily assume some definite liquid configuration, such as that typically produced by gravity whereby all liquid lies on one side of a horizontal plane. In absence of gravity such systems yield a result that in general depends critically upon the detailed position of the liquid within the tank. For example, if the tank is half full, such a system might typically indicate "empty" if all fluid happened to lie outside of the radiation beam; and might indicate "full" if the entire beam were immersed in fluid.

The present invention avoids such errors by so arranging the radiation source and detection system with respect to the region in question that the effective absorption produced by matter in the region is substantially independent of the configuration of that matter.

One aspect of the invention provides an extended radiation source system and an extended detection system, the source and detection systems being so distributed with respect to the bounded region that the density of "active radiation" is substantially uniform throughout the region. The term "active radiation" is defined as that radiation having such direction as to be sensed by the detection system.

A preferred manner of producing such a radiation field is to distribute the extended source system and the extended detection system upon complementary portions of a simple geometrical mapping surface that surrounds the bounded region, the source and detection portions of the mapping surface typically meeting in a closed line that defines a section surface lying in a plane and substantially bisecting the region. For example, the mapping surface may be a sphere with the section surface defined by a great circle of the sphere. The source and detection capabilities are then distributed on the respective portions of the mapping surface in such a way as to produce a pattern of active radiation that corresponds substantially to that which would result from a uniform, infinitely extending, plane source lying on one side of the region and a parallel, infinitely extending, plane detector lying on the other side of the region.

A preferred manner of producing a radiation field that is satisfactorily uniform in that sense is to distribute the extended source system and the extended detection system upon respective opposing portions of a simple geometrical mapping surface of the type described, with the concentrations of source and detection capability at each element of those surfaces varying approximately in proportion to the intensity that would be produced at those surfaces by an imaginary extended source uniformly distributed over the cross section of the mapping surface at the boundary between its source and detection portions; and also in proportion to the projection of the surface element onto that section.

For a region defined by a container of symmetrical geometrical form, such as a sphere or a cylinder, for example, the source and detection systems can be thus mapped directly onto opposite halves of the container surface, the source and detection distributions being typically identical and being derived from an imaginary uniform distribution over the cross section of the container that divides the two halves. Such theoretical distributions can be well represented in practice by a plurality of discrete source elements distributed in suitable manner adjacent one half of the container wall and a plurality of discrete detector elements suitably distributed adjacent the other half of the container wall.

In actual practice the source and detector distributions necessarily differ appreciably from the precise theoretical distributions based on the described mathematical mapping, due to space limitations, tank mounting structures and the like; and we have found experimentally that such departures can often be best compensated by introducing further variations from the theoretical ideal. However, the described mapping concept elucidates the primary characteristics of an effective distribution, and thus provides a sound basis for constructing a practical system.

Another aspect of the invention provides a modified response of the radiation detection system as a function of the depth of matter in the radiation path. The response departs appreciably from the usual exponential absorption of radiation, approaching more nearly a linear response. That novel response function of the invention is obtained typically by utilizing a source system producing initial radiation that is essentially monoenergetic, and making the detection system responsive only to received radiation quanta of energy within a selected band of energy appreciably less than the energy of the initial radiation quanta. The exact position of the energy band or "window" to which the detector is made responsive is typically selected, on the basis of direct tests of a particular system, to make the overall response of the system essentially independent of artificially produced variations in the configuration of the matter within the tank. The fact that such limitation of the response to a selected energy window permits the overall response to be made effectively independent of fluid position suggests that for each element of the radiation flux the response is more nearly a linear than an exponential function of the amount of matter present in the radiation path. In practice, however, it is covenient to adjust the window selection to give optimum overall results, rather than to give the most nearly linear response function for each flux element.

A particularly convenient manner of obtaining the described widow response of the detection system is to employ detection means of any suitable type that produces electrical pulses in response to individual received radiation quanta, the pulse height being a function of the radiation energy. The pulses are then supplied to discriminating circuitry which may be of known type and which passes on to a counter or the like only those pulses having a height within a selected range.

Whereas it is preferred to employ a system incorporating both aspects of the invention just described, each of those aspects is independently useful under certain conditions, as when maximum accuracy is not required.

A further aspect of the invention provides particularly convenient and economical means for constructing a distributed source system and for constructing a distributed detection system for penetrating radiation and for mounting them in suitable relation to a bounded volume such as a fuel tank, for example. Such means typically comprise sheet structures or "blankets" which are preferably at least somewhat flexible and in which source and detection elements are respectively embedded in desired spatial distributions. Such blankets may be preformed to fit the exterior contour of a given tank, and may be releasably mounted on the tank in any desired manner.

A particularly convenient and effective type of detection system provided by the invention comprises a plurality of transparent flexible rods capable of conducting light in the manner of optical light pipes, the rods being formed of a material that scintillates in response to penetrating radiation. One end of each rod is arranged to transmit light generated in the rod to a photo-responsive device such as a photomultiplier tube, for example. A single such phototube can receive signals from many rods, typically producing an electrical pulse of microsecond duration or less and of an amplitude that varies with the energy of the obsorbed radiation quantum.

A full understanding of the invention and of its further objects and advantages will be had from the following description of an illustrative manner in which it may be carried out. The particulars of that description, and of the accompanying drawings which form a part of it, are intended only as illustration, and not as a limitation upon the scope of the invention, which is defined in the appended claims.

Figures 2, 3, 4, 5:
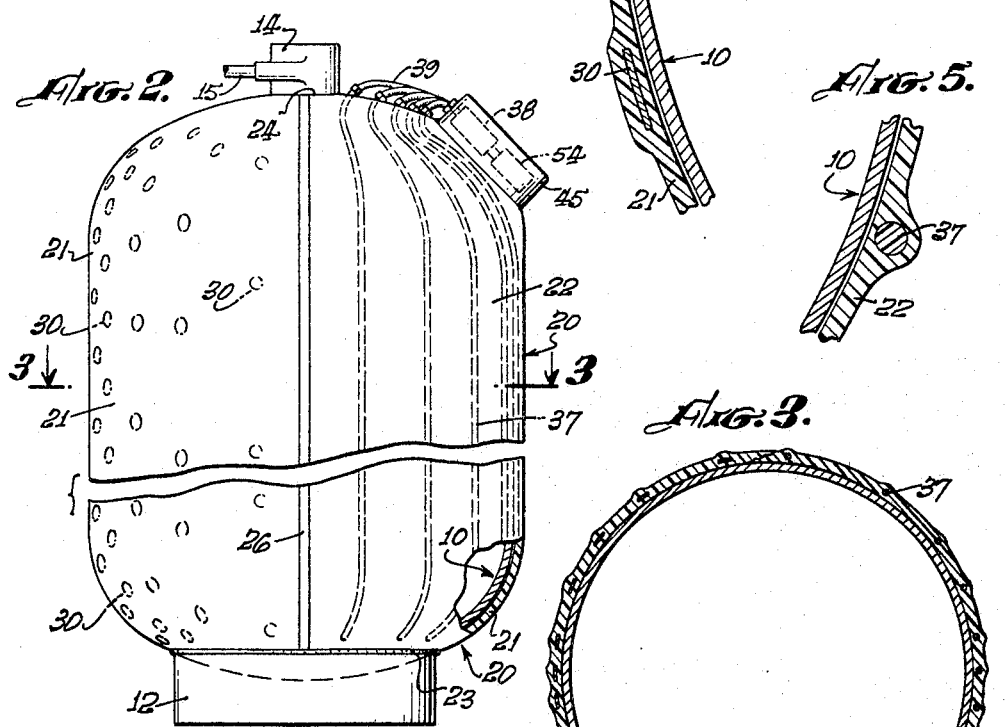
FIG. 2 is an elevation, partially cut away, showing an illustrative source and detection system for a generally cylindrical tank.
FIG. 3 is a section on line 3—3 of FIG. 2.
FIG. 4 is a detail of FIG. 3 at enlarged scale representing a source element.
FIG. 5 is a detail of FIG. 3 at enlarged scale representing a detection element.

The drawings illustrate how the invention may be employed to measure the quantity of a liquid in a container 10, which may represent a liquid propellant tank of a space vehicle, for example. The tank as shown in FIGS. 2 and 3 is generally cylindrical with rounded ends and is mounted by brackets 12 and 14, attached to its respective end faces. A conduit connection is indicated at 15 for propellant flow to and from the tank, and further connections may be provided as required.

The numeral 20 indicates generally a sheet structure, preferably somewhat flexible, which will be referred to for convenience as a blanket. Blanket 20 comprises two principal portions 21 and 22, which are preferably formed separately and can be assembled together about the tank to form an enclosing structure that normally closely fits the exterior surface of the tank. Blanket 20 has cutout sections where needed, as at 23 and 24, to accommodate the tank mounting brackets and the like. If such cutouts are not too large their effect on the overall measurement is generally negligible, or can be substantially compensated by a slight rearrangement of the source and detection elements, to be described. The two portions of blanket 10 are typically similar in form and size and meet in a plane through the tank axis. They may be connected together at 26 by a slide fastener or by other means such as bolts. The blanket itself may be made of any suitable material adapted for the anticipated environmental conditions. For example, sheet aluminum, thin plastic, or other somewhat flexible material such as fiberglass may be used. An important advantage of the described blanket structure is the ease of assembly and disassembly at any desired stage of the vehicle construction and operation.

A suitable radioactive material, natural or artificial, is carried by blanket portion 21 in predetermined distribution over the area of the blanket. That material is preferably in the form of discrete source elements 30 that are typically embedded in the material of the blanket in mutually spaced relation. Those source elements are shown illustratively as small disks. They may all be identical, or may vary in activity in a definite manner which is coordinated with the spacing of the elements to produce the desired effective source distribution, to be described more fully below. The blanket material may be thinned or cut away between source elements to reduce weight.

The source elements 30 typically comprise the artificial radioactive element cobalt-60 which has a half-life of 5.29 years, emitting beta particles of relatively small penetration and also gamma rays having initial energies of 1.17 and 1.33 mev. Those two energy values are so close together that for present purposes the gamma rays from cobalt-60 may be considered mono-energetic. Other radioactive materials, such as cesium-137, barium-137 and the inert gas krypton-85, for example, produce essentially mono-energetic penetrating radiation and are useful under certain conditions for the present purpose. It is usually desirable to select a type of radiation capable of penetrating the tank wall and then of penetrating the contained fluid to a depth of the full tank diameter with attenuation between about 20 and about 90 percent, maximum attenuation of about 60 to 80 percent being ordinarily preferred. The relatively high initial energy of the radiation from cobalt-60 is well adapted for measuring typical liquid hydrocarbons in depths of the order of one foot; whereas the much lower energy from krypton is useful for measuring more specialized materials such as liquid hydrogen having relatively low absorption. A krypton source may comprise permanently filled capsules or a system of tubes that can be filled only when required.

In the present specification and claims the term "penetrating radiation" includes in general energetic electromagnetic radiation such as gamma radiation resulting from nuclear transformations and Bremstrahlung resulting from interaction of fast electrons and the like with matter; neutrons, which may be produced in known manner by induced nuclear transformations; and secondary radiation of all types produced by the interaction of such emissions with matter, so long as the energy per quantum is sufficient to cause the required penetration of matter. The required degree of penetration varies widely with such factors as the size and wall structure of the container and the nature of the material in the tank. The invention is particularly useful for measuring liquids, which term here includes solid-containing fluids such as slurries. Many aspects of the invention are also useful for measuring gaseous materials and for solids that are not suspended in a fluid medium.

Blanket portion 22 carries detection means, responsive to the radiation emitted by source elements 30 of blanket portion 21 and typically responsive also to at least the more energetic of the secondary radiation produced by interaction of those primary emissions with matter. Such detection means may comprise individual solid state detectors of known type, indicated schematically at 34 in FIG. 1, which are connected electrically via the lines 35 to adding circuitry indicated at 36. The output from adder 36 then comprises a series of discrete electrical pulses representing the total of radiation quanta detected by all the elements 34. In the preferred form of the invention represented in FIGS. 2 to 5, a suitable scintillating transparent plastic material, such, for example, as polyvinyl toluene, doped with an active scintillating agent, is formed into a plurality of thin rods, indicated at 37. Those rods are arranged on or in blanket portion 22, being typically embedded in the body of the blanket as in FIG. 5. The rods have effectively polished side surfaces that totally reflect light transmitted longitudinally within them in the well known manner of optical light pipes. The rods may be coated in known manner to increase their transmission, and may be wrapped in aluminum foil or the like.

Figure 6:
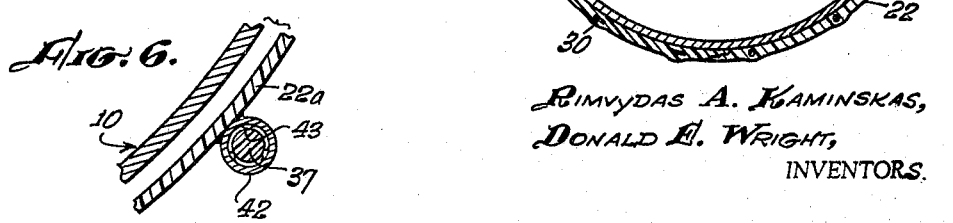
FIG. 6 is a detail corresponding to FIG. 5 and showing a modification.

The scintillating rods may be effectively protected from environmental conditions by enclosing each rod in a thin-walled tube of aluminum or the like, as represented at 42 in FIG. 6. That structure is especially useful in connection with a metal blanket 22a, to which the tube 42 may be soldered or spot welded. The internal diameter of tube 42 is preferably larger than the light pipe diameter, and the tube is internally dimpled at intervals as indicated at 43 to minimize contact of the light pipe with the tube wall.

At least one end of each rod 34 is arranged in light transmitting relation to a photoresponsive device, such as the photomultiplier tube indicated at 38 in FIG. 2. The rod ends may be mounted closely adjacent the sensitive element of the photomultiplier, or optical means of any suitable type may be interposed between them. In particular, it is convenient to employ an optical fiber structure of nonscintillating material as end portion of some or all of the detector rods, as at 39 in FIG. 2, in order to avoid an excessive density of detection capability close to the photosensitive tube.

With the described arrangement, light from a scintillation produced anywhere in the system of detector rods is transmitted by light piping action of the rods themselves to a common photosensitive device. The light pulses are thus summed optically, rather than electrically as in FIG. 1. The photosensitive device transforms each light flash into an electrical voltage pulse of amplitude corresponding to the flash intensity. Whereas it is usually convenient to employ only one phototube per blanket assembly, a larger number may be provided if preferred, each receiving light from a portion of the scintillating rods. The pulses from the several phototubes may then be processed and counted separately or may be added electrically in conventional manner at any desired stage of processing. The phototube and also the electronic circuitry for processing the electrical pulses, are preferably potted as at 45 in a suitable plastic or metal material essentially integrally with blanket structure 22 for environmental protection and light tight construction.

The electrical pulses from phototube 38 are amplified in conventional manner as required. The overall gain is preferably adjustable in conventional manner, either at photomultiplier 38 or at the amplifier, or both. The amplified pulses are then preferably supplied to a discriminator, indicated schematically at 54, which may be of conventional design, and which selects from the incoming pulses only those having a preselected pulse height. That is, pulses having pulse height less than the lower limit of the selected range are rejected; and pulses are also rejected if their height exceeds the upper limit of the selected range. Such filtering of signals is referred to as "window discrimination." The pulses thus selected, corresponding to a relatively narrow pulse height window, are transmitted to the counting circuit 56, which may be of conventional type. The term "pulse height" is employed in the present specification and claims to represent, in the usual manner, any convenient measure of the pulse energy. Whereas it is usually convenient to discriminate pulses on the basis of actual peak amplitude, closely similar results are obtainable with discrimination on the basis of pulse length, envelope area, or the like.

Counter 56 typically produces an output signal directly representing counts per second. That value may be displayed, recorded, telemetered to a ground station, or the like, by the output device indicated schematically at 60. Output device 60 may alternatively include computing means for comparing the existing count rate with the reference rate that is obtained with the tank empty, thereby producing an output signal directly representing the quantity of matter in the tank. If desired, a rate of flow signal may be derived by conventional differentiation of that output signal.

To make the response of the system essentially independent of the configuration of the matter present within the tank the radioactive sources 30 and the detection units 34 or 37 are distributed in such a way that the active flux of radiation at a volume element, that is, the flux that starts at the radioactive source and terminates at the detector, is substantially the same for all locations of the volume element within the tank. The flux of that active radiation at the volume element includes radiation which starts at the source and goes through the volume element, either before or after being scattered inside or outside the boundary of the tank, and which then terminates at the detection system.

That uniformity of active radiation flux throughout the tank volume is obtainable by arranging the actual source and detection elements so that the "active flux" within the tank is essentially equal to that which would result from an infinite, plane source of uniform intensity on one side of the tank and a parallel, infinite, plane, uniform detection system on the other side of the tank. Theoretical plane distributions of that type are represented schematically by the lines 60 and 62 in FIG. 1. We have discovered that actual distributions of the defined type can be satisfactorily approximated by arranging actual source and detection elements on respective opposing portions of a geometrical mapping surface, typically adjacent or directly on the tank surface. Such a mapping surface of cylindrical form is indicated schematically at 66 in FIG. 1, divided into source and detection portions by the plane section surface indicated at 68, which is an axial plane of the container. Each unit element $dS$ of the mapping surface 66 carries a source or detection capability approximately proportional to the product of two factors: the radiation intensity $I$ that would be produced at the surface element by a uniform source distribution on section surface 68, and the area of the perpendicular projection of the surface element $dS$ onto that section.

For the typical case of a long cylindrical tank 10, section surface 68 is an elongated rectangle and may be considered to be made up of elements $dx$ approximating infinite line sources. The intensity $dI$ at a surface element $dS$ at a point $(x_o, y_o)$ of mapping surface 66 due to the imagined source strength on the line $dx$ of section 68 is then proportional to the source density $X_o$ divided by the first power of the distance $r$ between $dx$ and $dS$. The first power applies because of the cylindrical nature of the distributions. Hence $$I(x_o, y_o) = X_o \int_{-R}^{R} \frac{dx}{r} \quad (1)$$

The second factor mentioned above, the projection of $dS$ onto section 68, is proportional to $\sin \theta$. Hence the desired source distribution $S(\theta)$ over mapping surface 66 should be approximately proportional to $I \sin \theta$. Evaluation of the above integral gives $$S(\theta) = \sin \theta \ln \frac{2 \cos (\theta/2) - (1 + \cos \theta)}{2 \sin (\theta/2) + (1 - \cos \theta)} \quad (2)$$

Figure 1:
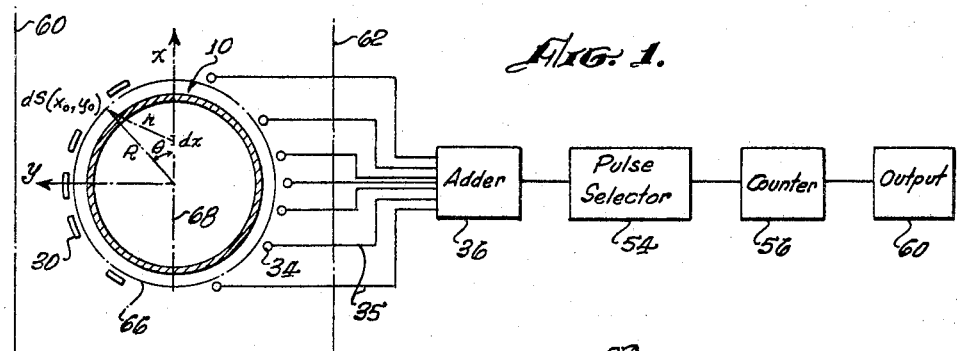
FIG. 1 is a schematic diagram illustrating the invention.
Figure 10:
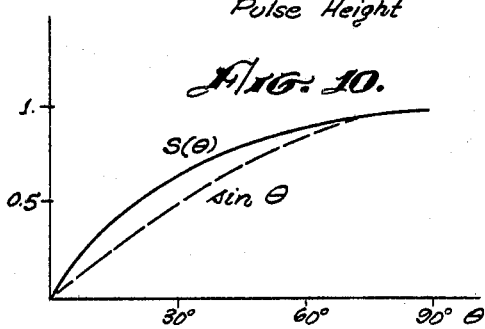
FIG. 10 is a graph of illustrative source and detection distribution.

The general nature of that function is shown graphically in solid lines in FIG. 10, with the function $\sin \theta$ shown in dashed lines for comparison. It is to be understood, for the preferred case of symmetrical mapping surfaces, that the distribution of the detection capability over the detection portion of mapping surface 66 is typically identical in form to the source distribution. In FIG. 1 the mapping surface is shown spaced outside of the tank boundary 10. However, in actual practice it is usually feasible to mount the source and detection elements essentially on the tank wall, typically as already described in connection with FIGS. 2 and 3.

In determining an actual distribution for a specific tank configuration it is usually desirable first to compute an ideal distribution on the basis just described; approximate that ideal distribution by suitable spacing of discrete source and detection elements; and then adjust that distribution to give optimum results in accordance with actual test measurements. For example, for an actual system associated with a cylindrical tank of the general form shown in FIG. 7, the distributions may usefully depart in either direction from the value (2) by an amount of the order of magnitude indicated by the area between the two curves of FIG. 10. By such adjustments it is possible to compensate in large measure for such factors as end effects and the fact that the actual distribution is discrete rather than continuous.

As indicated qualitatively in the figures, such mapping leads to distributions in which the source and detector densities are greatest at points close to the planes 60 and 62 and decrease progressively around the curve of the tank surface in a manner somewhat resembling a sine function. The density of distribution also varies somewhat longitudinally of a cylindrical tank, displaying a gradual minimum at the midplane and increasing to a maximum close to the junction of the side and end walls. That variation is not explicity shown in FIG. 2, being typically relatively slight compared to the variation in a transverse plane.

Pulse selector 54 is set to select pulses corresponding to a radiation window centered at an energy value appreciably less than the energy $E_o$ of the initial penetrating radiation emitted from sources 30. Interaction of such radiation with matter tends to produce secondary radiation having in general lower energy and modified direction. That secondary radiation may be similar in nature to the original radiation, or may be quite different. Thus primary gamma radiation may be Compton-scattered with change of direction and energy, or may produce secondary electrons or other forms of secondary radiation that are further attenuated or transformed by matter and finally reach the detector along with the gamma rays of initial and of degraded energy. By centering the detection window at an energy level appreciably less than the initial radiation energy, the response function may be considered to be heavily weighted in favor of such secondary radiation.

Figure 8:
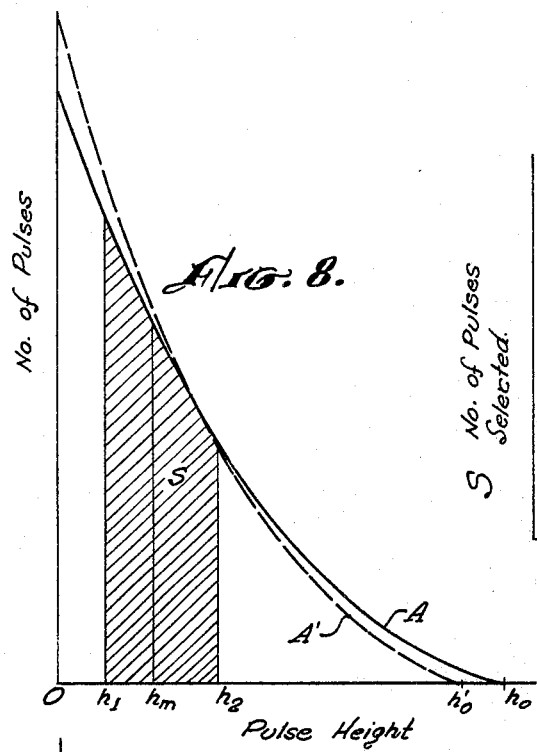
FIG. 8 is a schematic graph illustrating pulse distribution and selection.

FIG. 8 is a schematic graph in which the solid curve A represents typical variation of the number of pulses supplied to selector 54 as a function of pulse height for some definite setting of the gain adjustment of photomultiplier 38 or of an adjustable amplifier in the system. Although there is a general correspondence between the pulse height and the energy of the radiation quantum producing it, that relation is not precise, due to irregularities of many types in the action of the detection system. One such source of irregularity, in the present type of detector, results from the appreciable attenuation of a light pulse as it passes along a rod 37, causing the scintillation brightness delivered to sensor 38 to depend upon the axial position at which it is produced. Because of such effects, curve A of FIG. 8 typically does not show a pronounced peak at a pulse height that corresponds to the initial radiation energy. However, the pulse height $h_o$ at which curve A reaches zero represents the maximum possible response of the system to radiation of that initial energy. If selecting circuit 54 is set to pass pulses of height between $h_1$ and $h_2$, then the number of pulses supplied to counter 56 (FIG. 1) is represented by the shaded area S of the graph. The width of the window $h_1$ to $h_2$ is not critical, and is selected on the basis of such practical considerations as obtaining adequate count rates. The position of the window, which is more significant for the present invention, may be defined by the limiting pulse heights $h_1$ and $h_2$, or by some average value, such as the median pulse height $h_m$ within the window, which is the value for which equal numbers of pulses are selected above and below $h_m$.

The effective window position can be varied by adjusting selecting circuitry 54 to alter $h_1$ and $h_2$ in a desired manner. Or, for fixed selector adjustment, the window position may be shifted relative to $h_o$ by varying the gain of the system at some point ahead of the selector. If that gain is decreased, for example, by approximately 10%, curve A is shifted to some such position as the dashed curve A'. That is, the maximum pulse height that the detection system is capable of producing in response to radiation of maximum energy is reduced from $h_o$ to $h_o'$, and the right hand portion of curve A' is lower than A. However, at low values of $h$ the number of pulses per unit increment of $h$ is increased by such a decrease in gain, so that the left portion of curve A' is higher than A. Hence in general such a change in gain produces a change in total number S of pulses selected. However, for every setting of the selection window at discriminator 54 there is some value of gain for which S is essentially unchanged by small variations in gain.

Figure 9:
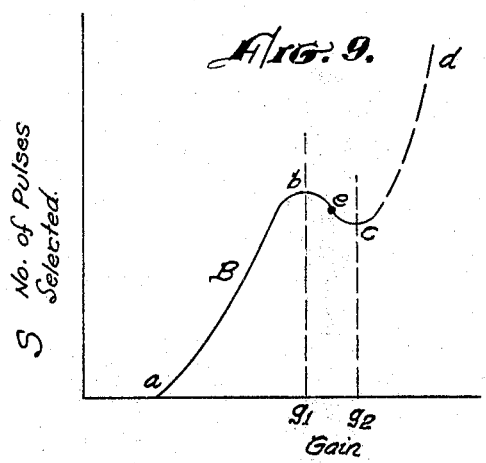
FIG. 9 is a schematic graph illustrating pulse selection.

In fact, if the number S of pulses selected is plotted against the system gain for fixed window setting, a curve of the general form of B in FIG. 9 is typically obtained. That curve has a main portion $ab$ which rises from zero to a maximum at $b$, then a shorter declining portion $bc$, and finally, as the gain is further increased, the number S of selected pulses increases essentially indefinitely, as indicated at $d$, due primarily to background radiation and noise.

In accordance with the present invention, the dependence of the pulse count upon the distribution of matter within the tank or other region can be minimized by proper selection of the position of window $h_1$ to $h_2$ with respect to the pulse height function A of FIG. 8. The most satisfactory position of that window can best be determined for any particular system by direct test. However, in general the optimum window position has been found to be one for which the selected pulse height represents essentially the median value of all pulses supplied to the selecting circuit, in the sense that the number of pulses rejected because they are too small is approximately equal to the number of pulses rejected because they are too large. In graphical terms that condition means that the area under curve A to the left of $h_1$ is approximately equal to the area under curve A to the right of $h_2$. That condition therefore provides a sufficient criterion for defining a definite theoretical window position. After adjusting the system in accordance with such a theoretiacl criterion, it is preferred to test its performance experimenally, and the performance can often be significantly improved by further adjustments of either the gain or the selector settings. However, the described criterion provides a valuable reference point and is met at least approximately under practical operating conditions.

An alternative method of initially adjusting a detection system, which is in some respects more convenient than that just described, utilizes the curve of FIG. 9. For given settings of selector 54, the system gain is varied and curve B is plotted. The gain is then set to a point the between the values, indicated at $g_1$ and $g_2$, that correspond to maximum $b$ and minimum $c$ of curse B. It is generally preferred to set the gain approximately at the inflection point $e$ of the curve, at which the variation in selected counts is an essentially linear function of gain, with negative slope. That gain setting is found to correspond essentially to the theoretical criterion previously defined with respect to FIG. 9.

The primary utility of both of the defined criteria for selection of the window position is their practical value in making the number of selected counts, for any given amount of matter present in the bounded volume, essentially independent of the distribution of that matter. That independence indicates that with the defined window selection the number of counts selected is essentially a linear function of the amount of matter in the radiation path, in contrast to the usual exponential attenuation of radiation.

The described result is obtainable with a pulse height window so positioned that the median selected pulse height $h_m$ corresponds to a quantum energy from about $\frac{1}{10}$ to about $\frac{1}{2}$ of the initial gamma radiation energy $E_0$.

As an illustration of the invention, and not by way of limitation, with source and detection blankets of the generaly type illustrated in FIGS. 2 to 7, and utilizing gamma rays from cobalt-60, a median value $h_m$ corresponding to a pulse energy from about 200 to about 500 kev. is ordinarily satisfactory. Best results have been obtained with a value from 250 to 300 kev., or about one fifth of the initial radiation energy $E_0$. The window limits $h_1$ and $h_2$ are then typically aprpoximately 100 and 600 kev., respectively.

Limitation of the pulses counted in the manner described has the further advantage that it tends to compensate the error that might otherwise result from attenuation of the scintillations in light pipes 37 before they are converted to electrical form. With a "window" close to $h_0$, the effect of such attenuation is to weight the detection system in favor of radiation received close to the delivery end of a light pipe. Selection of a window at very low pulse height has the opposite effect. A window at an intermediate value of pulse height, such as has been described, tends to avoid either of those effects, and to make the count rate essentially the same for equal concentrations of matter near one end or the other of the light pipes.

Figure 7:
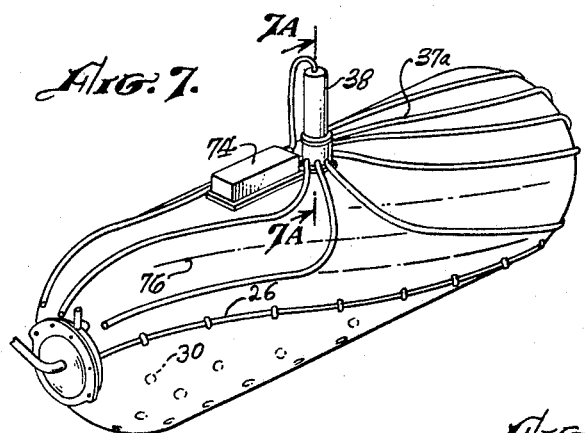
FIG. 7 is an elevation showing a modification.
Figure 7A:
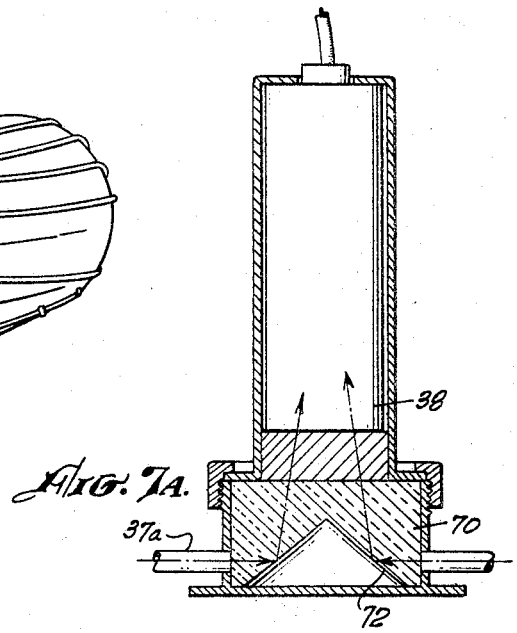
FIG. 7A is a section on line 7A—7A of FIG. 7, at enlarged scale.

FIGS. 7 and 7A illustrate an illustrative modification which is especially useful for measuring liquids present in a tank under conditions causing the direction of the effective gravity to shift angularly about the tank axis. For example, when the axis of the cylindrical tank of FIGS. 2 and 3 is horizontal and the tank may assume various angular positions about that axis with respect to gravity, any deviation from the ideal angular source and detector distribution will cause the same error along the entire length of the tank. Although such a deviation might be negligible for most random distributions of liquid, it could thus become appreciable at certain angular positions of the gravity vector. That type of additive error is avoided in the arrangement of FIG. 7 by twisting the entire configuration helically about the tank axis. The pitch of the helical twist is preferably large compared to the tank diameter, being typically from about four to about twenty diameters, depending upon the tank length. A total twist of from about 45° to about 120° between the tank ends is preferred. Each longitudinal section of the tank then behaves essentially as if there were no helical twist. Yet the liquid near one end of a horizontal tank is ararnged quite differently from that at the other end with respect to the source and detector assemblies, tending to compensate any error of the type described. The axial surface that corresponds to section 68 of FIG. 1 is then also helically twisted, but that twist is typically small enough that it can be neglected and the surface considered an axial plane for most purposes.

FIG. 7A illustrates a preferred optical summing device for exposing the photoelectric sensor uniformly to light from a large number of light pipes. The light pipes enter the cylindrical base 70 radially, and light emitted from their ends is reflected by the conical surface 72 in a direction to impinge upon the sensitive element of the photomultiplier tube or other device indicated at 38. The remainder of the electronic circuitry may be housed at 74. In the arrangement of FIG. 7 the photosensor is placed midway of the length of the tank, reducing the average length of the individual light pipes. Each of the light pipes may have a portion of nonscintillating material adjacent sensor 38, if desired, as already described in connection with FIG. 2.

FIG. 7 further illustrates a mutually staggered arrangement of the detector rods 37a at the two longitudinal halves of the tank. The rods at one end of the tank are not alined with those at the other end, but with the lines 76 drawn half way between adjacent rods at the other end. The arrangement is especially useful when the number of rods must be reduced to a minimum, as to save weight, tending to compensate any errors due to the use of finite, mutually spaced detector elements instead of truly uniformly distributed detection capability. Whereas the junction between the two blanket sections is shown illustratively in FIG. 7 as having the same helical twist as the source and detection configurations, that junction may be less sharply twisted, or even not twisted at all in some cases.

The elongated detection elements 37 may be replaced, if desired, by detection means of any suitable type. Solid state detectors are well known, which directly produce electrical pulses in response to received high energy radiation. Lithium ion drift semiconductor nuclear particle detectors are illustrative of such solid state devices, in which penetrating radiation produces electron-hole pairs in a depletion region of the semiconductor. Ordinary ionization counters of the proportional type are also suitable. Nonproportional counters are useful only if the described window discrimination technique is not to be employed.

We claim:

1. A system for indicating the quantity of matter within a region of definite form substantially independently of tre distribution of such matter therein, said system comprising in combination means for projecting into the region through the surface portion thereof on one side of a section surface penetrating radiation capable of traversing the region when filled with said matter with attenuation not exceeding about 90 percent and having within the region approximately the same distribution of intensity and direction that would result from a uniformly distributed and infinitely extending source of such radiation lying in a plane adjacent the region on one side thereof and generally parallel to said section surface, means for detecting penetrating radiation leaving the region through the surface portion thereof on the other side of said section surface, said detecting means being arranged to have substantially the same relative response to such radiation as an infinitely extending uniform detector lying in a plane adjacent the region on the other side thereof and parallel to the first said plane, and means responsive to said detecting means for indicating the quantity of matter within the region, such indication being approximately uniform for all possible distributions within the region of such quantity of matter, including essentially random distributions.

2. A system for indicating the quantity of matter within a region of definite form substantially independently of the distribution of such matter therein, said system comprising in combination a plurality of sources of penetrating radiation capable of traversing the region when filled with said matter with attenuation not exceeding about 90 percent and of predetermined respective intensities, means for mounting said sources in predetermined spatial distribution essentially on a geometrical mapping surface that partially encloses the region.

a plurality of detection elements responsive to penetrating radiation incident thereon, means for mounting said detection elements in predetermined spatial distribution essentially on a second geometrical mapping surface, said two mapping surfaces essentially enclosing the region and lying on opposite sides of a generally plane section surface that substantially bisects the region, the distribution of the mounted sources and the distribution of the mounted detection elements producing source and detection capabilities for each surface element of the respective mapping surfaces approximately proportional to the area of the projection of that surface element onto the section surface multiplied by the radiation intensity that would be produced at the surface element by an imaginary source distributed uniformly over said section surface, and output means controlled by said detection elements for indicating the quantity of matter within the region, such indication being approximately uniform for all possible distributions within the region of such quantity of matter, including essentially random distributions.

3. A system as defined in claim 2, and wherein said region is bounded by a wall and said two geometrical mapping surfaces substantially coincide with complementary portions of the wall.

4. A system for indicating the quantity of matter within a container having a generally cylindrical bounding wall, substantially independently of the distribution of such matter within the container, said system comprising in combination a plurality of sources of penetrating radiation capable of traversing the container when filled with said matter with attenuation not exceeding about 90 percent and of predetermined respective intensities, means for mounting said sources adjacent the portion of the container wall on one side of an axial surface in mutually spaced essentially symmetrical non-uniform distribution having maximum density farthest from said surface and decreasing progressively to zero density at said surface, a plurality of detection elements responsive to penetrating radiation incident thereon, means for mounting said detection elements adjacent the portion of the container wall on the other side of said axial surface in mutually spaced essentially symmetrical non-uniform distribution having maximum density farthest from said surface and decreasing progressively to zero density at said surface, said sources and detection elements being so distributed that the intensity of radiation emitted by the sources and received by the detection elements is essentially uniform throughout the interior of the container, and output means controlled by said detection elements for indicating the quantity of matter within the container, such indication being substantially uniform for all possible distributions within the container of such quantity of matter, including essentially random distributions.

5. A system for indicating the quantity of matter within a container having a generally cylindrical bounding wall, substantially independently of the distribution of such matter within the container, said system comprising in combination a plurality of sources of penetrating radiation of predetermined respective intensities, means for mounting said sources adjacent the portion of the container wall on one side of an axial surface in essentially symmetrical distribution having maximum density farthest from said surface and decreasing to zero density at said surface, a plurality of detection elements responsive to penetrating radiation incident thereon, means for mounting said detection elements adjacent the portion of the container wall on the other side of said axial surface in essentially symmetrical distribution having maximum density farthest from said surface and decreasing to zero density at said surface, said sources and detection elements being so distributed that the intensity of radiation emitted by the sources and received by the detection elements is essentially uniform throughout the interior of the container, and said source and detection distributions being helically twisted about the cylindrical axis of the container with a helical pitch between about four and about twenty times the diameter of the container, and output means controlled by said detection elements for indicating the quantity of matter within the container.

6. A system for indicating the quantity of matter within a container having a generally cylindrical bounding wall, substantially independently of the distribution of such matter within the container, said system comprising in combination a plurality of sources of penetrating radiation of predetermined respective intensities, means for mounting said sources adjacent the portion of the container wall on one side of an axial surface in essentially symmetrical distribution having maximum density farthest from said surface and decreasing to zero density at said surface, a plurality of detection elements responsive to penetrating radiation incident thereon, means for mounting said detection elements adjacent the portion of the container wall on the other side of said axial surface in essentially symmetrical distribution having maximum density farthest from said surface and decreasing to zero density at said surface, said sources and detection elements being so distributed that the intensity of radiation emitted by the sources and received by the detection elements is essentially uniform throughout the interior of the container, and said source and detection distributions being helically twisted about the cylindrical axis of the container with a helical pitch such that the circumferential distributions adjacent respective ends of the container are mutually rotated about the axis through an angle between about 45° and about 120°, and output means controlled by said detection elements for indicating the quantity of matter within the container.

7. A system as defined in claim 4, and wherein said detection elements comprise elongated optical light pipes formed of transparent plastic material that scintillates in response to incident penetrating radiation, said output means comprising photoresponsive means adapted to receive light from at least one end of each optical light pipe, and electrical circuit means controlled by said photoresponsive means and adapted to produce electrical pulses in response to scintillations in the optical pipes.

8. A system as defined in claim 7 and wherein said light pipes are arranged on the container wall approximately parallel to the cylindrical axis of the container, with individual non-scintillating optical light pipes interposed between respective ones of the light pipes and the photoresponsive means for conducting light therebetween.

9. A system for indicating the quantity of matter within a container, said system comprising in combination
means for projecting penetrating radiation into the container adjacent one portion of the container wall,
a plurality of elongated optical light pipe means formed of transparent plastic material that scintillates in response to incident penetrating radiation mounted adjacent another portion of the container wall,
said container being generally cylindrical and the optical light pipe means extending generally parallel to the cylindrical axis of the container and mutually spaced circumferentially of the container,
photoresponsive means adapted to receive light from the light pipe means,
and electrical circuit means controlled by said photoresponsive means and adapted to produce electrical pulses in response to scintillations in the light pipe means,
and means responsive to the circuit means for indicating the quantity of matter within the container.

10. A system as defined in claim 9, and wherein the photoresponsive means comprise a photosensitive element mounted intermediate the length of the container and receiving light from two sets of optical light pipes which extend axially in opposite directions therefrom,
the light pipes of the two sets being circumferentially offset with respect to each other.

11. A system as defined in claim 9, and wherein the optical light pipe means are helically twisted about the cylindrical axis with a helical pitch between about four and about twenty times the diameter of the container.

12. A system for indicating the quantity of matter within a container of definite form substantially independently of the distribution of such matter therein, said system comprising in combination
means for projecting into the container penetrating radiation of substantially uniform initial energy per radiation quantum and having within the container substantially the same distribution of intensity and direction that would result from a uniformly distributed and infinitely extending source of such radiation lying in a plane adjacent the container on one side thereof,
means for detecting penetrating radiation leaving the container and for producing in response to each detected radiation quantum an electrical pulse of pulse height corresponding generally to the energy of that quantum, said detecting means being arranged to have substantially the same relative response to such radiation as an infinitely extending uniform detector lying in a plane adjacent the container on the other side thereof and parallel to the first said plane,
means for electrically selecting only those pulses having pulse heights within a predetermined limited range less than the pulse height that corresponds to said initial energy, said predetermined pulse height range being such that the number of pulses so selected per unit time for a particular quantity of matter in the container is approximately uniform for all possible distributions in the container of such matter, including essentially random distributions,
and means responsive to the selected pulses for indicating the quantity of matter in the container.

13. A system for detecting the presence of matter in a volume between two spacedly opposed boundaries, comprising in combination
means for projecting into the volume from one boundary gamma radiation of substantially uniform initial energy per radiation quantum,
means for receiving resultant high energy radiation leaving the volume at the other boundary and for producing an electrical pulse of magnitude corresponding generally to the energy of each received radiation quantum, the pulse magnitudes varying essentially continuously from a maximum value corresponding to directly transmitted radiation to progressively smaller values corresponding to radiation transmitted with energy degradation,
means for electrically selecting only those pulses having pulse heights within a predetermined limited range less than said maximum value and greater than the smallest of said smaller values, said predetermined pulse height range being such that the number of pulses so selected per unit time decreases approximately linearly with increasing quantity of matter in the path of the radiation between said volume boundaries,
and means responsive to the selected pulses for indicating the presence of matter in the volume.

14. A system as defined in claim 13, and wherein the median pulse height of said selected pulses has a value between about $1/10$ and about $1/2$ of the pulse height that corresponds to said initial energy.

15. In combination with a container of definite form having a container wall,
structure forming a somewhat flexible sheet adapted to fit an exterior surface of the container wall,
a plurality of discrete sources of penetrating radiation carried by the sheet in predetermined spatial distribution,
means for releasably mounting the sheet in fitting relation to said wall surface,
and means responsive to radiation emitted from said sources and transmitted by the interior of the container.

16. In combination with a container of definite form having a container wall,
structure forming a somewhat flexible sheet adapted to fit an exterior surface of the container wall,
a plurality of detecting elements responsive to penetrating radiation incident thereon and carried by the sheet in predetermined spatial distribution,
means for releasably mounting the sheet in fitting relation to said wall surface,
means for projecting penetrating radiation into the interior of the container toward said wall surface,
and output means controlled by said detecting elements for indicating the presence of matter within the container.

17. The combination defined in claim 16, and wherein said detecting elements comprise optical light pipes formed of transparent plastic material that scintillates in response to incident penetrating radiation,
and said output means comprise photoresponsive means adapted to receive light from at least one end of each light pipe,
and electrical circuit means controlled by said photoresponsive means and adapted to produce electrical pulses in response to scintillations in the light pipes.

18. The combination defined in claim 16, and wherein said detecting elements comprise
optical light pipes formed of transparent plastic material that scintillates in response to incident penetrating radiation,
and said output means comprise a photomultiplier tube having a light sensitive element,
a plurality of said light pipes having one end thereof arranged in light-transmitting relation with the light sensitive element of the photomultiplier tube,
and circuit means connected to the photomultiplier tube for producing electrical pulses in response to scintillations in the last said light pipes.

19. A system for indicating the quantity of matter within a container, said system comprising in combination means for projecting into the container through one portion of the container wall and in a direction to emerge from the container through another portion of the container wall, penetrating radiation capable of traversing the container when filled with said matter with attenuation not exceeding about 90 percent, a plurality of elongated optical light pipe means formed of transparent plastic material that scintillates in response to incident penetrating radiation, means mounting the light pipe means with a preponderant portion of their respective lengths mutually spaced and forming an essentially two dimensional detection array adjacent to and substantially coextensive with said other portion of the container wall, said mutual spacing of the mounted light pipe means being non-uniform to produce a detection capability that varies in a predetermined manner as a function of position in the two-dimensional array, photoresponsive means adapted to receive light from at least one end of each the light pipe means and to produce an electrical signal responsive to scintillations therein, and output means controlled by the signal for indicating the quantity of matter within the container.

References Cited

UNITED STATES PATENTS

| | | | |
|---|---|---|---|
| 2,920,204 | 1/1960 | Youmans | 250—71.5 X |
| 3,100,841 | 8/1963 | Reider | 250—43.5 |
| 3,169,187 | 2/1965 | Stone et al. | 250—71.5 |
| 3,170,064 | 2/1965 | Martin | 250—43.5 |
| 3,225,193 | 12/1965 | Hilton et al. | 250—71.5 |

ARCHIE R. BORCHELT, Primary Examiner

U.S. Cl. X.R.

250—71.5, 227